UNITED STATES PATENT OFFICE.

WILLIAM R. SMITH, OF BOSTON, ASSIGNOR TO HIMSELF, JOSEPH W. HAS-
KINS, OF SAME PLACE, AND NICHOLAS B. WITHAM, OF LYNN, MASS.

IMPROVEMENT IN CONFECTIONERY FROM PARCHED CORN.

Specification forming part of Letters Patent No. 152,019, dated June 16, 1874; application filed May 9, 1874.

*To all whom it may concern:*

Be it known that I, WILLIAM R. SMITH, of Boston, in the county of Suffolk and State of Massachusetts, have invented a new and useful Improvement in Edible Compounds; and I do hereby declare that the following is a full, clear, and exact description thereof, which will enable others skilled in the art to which it pertains to make and use the same.

My invention relates to an improvement in confections or edible compositions, and the process or mode of making or compounding the same.

The ingredients composing my composition are, parched corn, sugar, and albumen, or the white of eggs. The proportions of the same are, ten pounds of sugar, (preferably loaf-sugar, on account of its purer and higher crystalline character,) eight quarts of parched maize, or Indian corn, and the white of one egg.

I am aware that popped corn has been ground or broken up and mixed with molasses and made into balls to be sold and eaten.

I am also aware that an edible composition has been made of ground popped corn and a solution of gum-acacia and mixed with a sweetening or flavoring matter, or both, each of such compounds being simple mixtures compounded in a cold state. Such I do not claim.

I am also aware that a cake compound has been made of popped corn, sugar, and starch, the ingredients being treated and compounded by means of heat, as set forth in the rejected application of R. Melvin, filed March 25, 1867. Such compound, nor the process by which it is made, I do not claim.

In preparing my confection or edible composition I place the sugar in any suitable vessel and add thereto a sufficient quantity of water to dissolve it. I next take the white or albuminous part of one egg, and put the same into another vessel, and add thereto one-half a pound of finely-pulverized white sugar, and beat the same for about thirty minutes, until a high degree of fomentation has been reached. The corn, having been parched, may be comminuted, if desirable. Heat having been applied to the solution of sugar and water, it is to be raised to a boiling temperature and kept in a state of ebullition for about thirty minutes, or until the solution is reduced to the consistency of thick sirup. This having been effected, the parched maize and the albuminous mixture are to be added to the dissolved sugar while the latter is in a state of ebullition, and the whole quickly stirred until the ingredients are thoroughly commingled, the albuminous mixture producing a high state of fomentation of the whole mass, when it is to be poured into any suitable-shaped molds and cooled. When sufficiently cooled it may be readily separated from the molds, when it is ready for the market or for use.

I would remark that my improved process may be employed in making confections in which raisins, currants, or other dried fruits, or the kernels of nuts, are substituted for or in the place of the maize. So, also, any desired color may be given to the compound, as well as any flavor that fancy may dictate.

Having described my invention, what I claim is—

1. My improved confection or edible composition, as made of maize, sugar, and albumen compounded and treated in manner as set forth.

2. My improved process of making confections, as above set forth.

In testimony that I claim the foregoing as my own invention, I affix my signature in presence of two witnesses.

WM. R. SMITH.

Witnesses:
F. P. HALE,
JOSEPH W. HASKINS.